Patented Apr. 1, 1924.

1,488,915

UNITED STATES PATENT OFFICE.

FREDERICK GELSTHARP, OF TARENTUM, PENNSYLVANIA, ASSIGNOR TO PITTSBURGH PLATE GLASS COMPANY, A CORPORATION OF PENNSYLVANIA.

PROCESS AND BATCH FOR MAKING SHEET GLASS.

No Drawing. Application filed December 16, 1920. Serial No. 431,212.

*To all whom it may concern:*

Be it known that I, FREDERICK GELSTHARP, a citizen of Great Britain, and a resident of Tarentum, in the county of Allegheny and State of Pennsylvania, have made a new and useful Invention in Processes and Batches for Making Sheet Glass, of which the following is a specification.

The invention relates to the manufacture of sheet glass, such as plate glass and window glass, and has for its principal objects the provision of an improved batch and process, (1) wherein the use of salt cake for fining the glass is partly or entirely avoided and calcium sulphate (or some material containing such sulphate) or some other cheaper and more readily obtainable sulphate substituted, and (2) wherein a somewhat superior quality of glass is obtained, although having substantially the same composition as that produced where the salt cake is employed.

Salt cake at times becomes very scarce and it therefore becomes desirable to provide a substitute which can be readily obtainable at all times and at a cost below that of the salt cake. It has been found that calcium sulphate ($CaSO_4$) constitutes such a substitute in securing a fining of the glass and such compound may be introduced in various forms such as in ground gypsum or anhydrite or a calcined gypsum (plaster of Paris) or precipitated sulphate of calcium. To indicate the character of the substitution of the gypsum for the salt cake, a comparison of a characteristic batch heretofore commonly used employing salt cake, and the same batch with the calcium sulphate substituted for the salt cake will be made. The following is an approximate statement of the old formula as employed in the manufacture of plate glass:

|  | Parts. |
|---|---|
| Sand ($SiO_2$) | 1000 |
| Soda ash (sodium carbonate $Na_2CO_3$) | 284 |
| Salt cake (sodium sulphate) (95° $Na_2SO_4$) | 60 |
| Limestone (calcium carbonate $CaCO_3$) | 309 |
| Common salt (sodium chloride NaCl) | 25 |
| Coal | 3 |
| Arsenic (arsenious oxid $As_2O_3$) | 5 |

With the foregoing batch the boiling or ebullition for fining the glass is produced by the decomposition of the salt cake which action is made effective by the action of the charcoal or coal, and the reducing flame of the furnace. They act to change a part of the salt cake into a sulphide, arsenate and sulpharsenate also being formed, these compounds together then reacting with some of the undecomposed salt cake producing a boiling effect in the molten glass when its temperature has reached the fining stage. This boiling action in the concluding portion of the operation serves to clear the glass of a large portion of the bubbles held in the glass, such action being known in the art as "fining the glass" and constituting an essential step in the production of commercial plate glass.

I have found that this same fining action is secured with corresponding reactions when calcium sulphate or a material containing it is substituted for the salt cake. In such case the calcium sulphate reacts with some of the soda ash to form sodium sulphate, such action occurring at a stage in the melting operation preceding the fining. The sodium sulphate thus formed later reacts in the fining operation just as heretofore set forth. In case gypsum is used in place of the salt cake the new batch would be as follows:

|  | Parts. |
|---|---|
| Sand | 1000 |
| Soda ash | 317 |
| Gypsum (78.6% $CaSO_4$) | 69 |
| Limestone | 268 |
| Common salt | 25 |
| Coal | 3 |
| Arsenic | 5 |

Gypsum varies somewhat in composition, a typical analysis of such material as employed in the foregoing formula being as follows:

|  | Per cent. |
|---|---|
| Calcium sulphate | 78.60 |
| Combined water | 20.00 |
| Calcium carbonate | .20 |
| Magnesium carbonate | .25 |
| Iron and aluminum oxide | .30 |
| Silica and insoluble | .65 |
|  | 100.00 |

In shifting from the old salt cake batch to the new batch as above stated, the weights of the material which are changed are preferably adjusted in accordance with chemical equivalent rations so that the resulting glass composition as produced by the new batch is substantially the same as that produced by the old batch.

As indicated before, the calcium sulphate may be introduced in different compounds, and if desired a part only of the salt cake may be replaced by the calcium sulphate. It is also possible that other sulphates aside from calcium sulphate may be substituted in part or in whole for the sodium sulphate of the salt cake, such as the sulphates of barium, magnesium or potassium, in which case, of course, a corresponding readjustment in the other ingredients of the batch may be necessary.

The glass produced by both the old and new formulas heretofore recited are what may be termed lime glass, such glass necessarily containing a relatively high amount of lime (CaO) as compared with the soda ($Na_2O$) in order to be sufficiently strong to be used for sheet glass. This proportion of lime to soda should not be less than 1 to 2 by weight, and it is preferable to have the proportions approximately 1 to 1 by weight. While gypsum and other materials containing calcium sulphate have been used as ingredients of glass batches, in so far as I am aware they have never been used to produce a lime glass having the strength necessary for plate and window glass and which reacts to provide sodium sulphate that in turn reacts at a later stage in the operation to produce a fining of the glass.

What I claim is:

1. The process of making a sheet glass melt which consists in fusing in a lime glass melt a sulphate other than sodium sulphate but capable of reacting in the melt to form sodium sulphate, causing such reaction to take place in the melt preliminary to the fining operation and utilizing such sodium sulphate to fine the glass.

2. The process of making a sheet glass melt which consists in fusing calcium sulphate in a lime glass melt, causing a reaction with such sulphate to form sodium sulphate in the melt preliminary to the fining operation, and utilizing such sodium sulphate to fine the glass.

3. The process of making a sheet glass melt which consists in fusing in a lime glass melt a sulphate of the calcium group, causing a reaction with such sulphate to form sodium sulphate in the melt preliminary to the fining operation, and utilizing such sodium sulphate to fine the glass.

4. The process or making a sheet glass melt which consists in fusing in a lime glass melt a sulphate other than sodium sulphate but capable of reacting in the melt to form sodium sulphate, causing such reaction to take place in the melt preliminary to the fining operation, and utilizing such sodium sulphate in conjunction with carbon and arsenic oxide to fine the glass.

5. The process of making sheet glass which consists in fusing gypsum in a lime glass melt, causing a reaction with the calcium sulphate in said gypsum to form sodium sulphate in the melt preliminary to the fining operation and utilizing such sodium sulphate to fine the glass.

6. A lime glass batch comprising sand, soda ash and limestone in conjunction with a sufficient quantity of sulphate other than sodium sulphate but capable of reacting in the melt to form sodium sulphate, to provide a fining agent for the glass when such first sulphate has reacted to form sodium sulphate.

7. A lime glass batch comprising sand, soda ash and limestone, in conjunction with a sufficient quantity of calcium sulphate to provide a fining agent after such calcium sulphate has reacted to form sodium sulphate.

8. A lime glass batch comprising sand, soda ash and limestone, in conjunction with a sufficient quantity of gypsum to provide a fining agent after the glass and the calcium sulphate of the gypsum has reacted to form sodium sulphate.

9. A lime glass batch comprising sand together with lime and soda having a ratio of lime to soda greater than 1 to 2 together with a sufficient quantity of sulphate other than sodium sulphate but capable of reacting in the melt to form sodium sulphate to provide a fining agent for the glass when such first sulphate has reacted to form sodium sulphate.

10. A lime glass batch comprising sand together with lime and soda having a ratio of lime to soda greater than 1 to 2 together with approximately 3 per cent by weight of calcium sulphate to provide a fining agent for the glass when such sulphate reacts to form sodium sulphate.

In testimony whereof, I have hereunto subscribed my name this 13th day of December, 1920.

FREDERICK GELSTHARP.

Witness:
G. C. DODSON.